(12) United States Patent
Nie et al.

(10) Patent No.: US 11,350,778 B2
(45) Date of Patent: Jun. 7, 2022

(54) TEMPERATURE CONTROL CUP

(71) Applicant: Thero, Inc., Dover, DE (US)

(72) Inventors: Xin Nie, Woburn, MA (US); Ruohan Yang, Woburn, MA (US)

(73) Assignee: Thero, Inc., Dover, DE (US)

( * ) Notice: Subject to any disclaimer, the term of this patent is extended or adjusted under 35 U.S.C. 154(b) by 120 days.

(21) Appl. No.: 16/894,906

(22) Filed: Jun. 8, 2020

(65) Prior Publication Data
US 2021/0068568 A1    Mar. 11, 2021

Related U.S. Application Data

(60) Provisional application No. 62/896,245, filed on Sep. 5, 2019.

(51) Int. Cl.
*A47G 19/22* (2006.01)
*A47J 41/00* (2006.01)

(52) U.S. Cl.
CPC ...... *A47G 19/2288* (2013.01); *A47J 41/0072* (2013.01); *A47J 41/0044* (2013.01)

(58) Field of Classification Search
CPC ............ A47G 19/2288; A47G 19/2205; A47J 41/0072; A47J 41/0044; A47J 41/0055; A47J 41/00; A47J 41/0077; A47J 41/0038; B65D 81/3865; B65D 81/3869; B65D 81/3872; B65D 81/3484
See application file for complete search history.

(56) References Cited

U.S. PATENT DOCUMENTS

| | | | | |
|---|---|---|---|---|
| 6,634,417 | B1* | 10/2003 | Kolowich | C09K 5/063 165/10 |
| 2006/0156756 | A1* | 7/2006 | Becke | A47G 19/2288 62/457.3 |
| 2012/0118897 | A1* | 5/2012 | Davis | F25D 3/08 220/592.01 |
| 2014/0263368 | A1* | 9/2014 | Booska | A47G 19/2288 220/592.17 |
| 2015/0052933 | A1* | 2/2015 | Darrow | A47G 19/2288 62/457.1 |
| 2017/0071381 | A1* | 3/2017 | Ze | B65D 81/3844 |

* cited by examiner

*Primary Examiner* — Don M Anderson
(74) *Attorney, Agent, or Firm* — Bayramoglu Law Offices LLC

(57) ABSTRACT

A temperature control cup includes a cup body and a cup cover, and the cup cover is covered on the cup body. The cup body is provided with a cup outer shell, a cup middle shell, and a cup inner wall in order from the outside to the inside. A vacuum heat insulation layer is provided between the cup shell and the cup middle shell. A gas getter is provided in the vacuum heat insulation layer at the bottom of the cup body. A phase change material layer is provided between the middle shell and the inner wall of the cup body. The bottom center of the cup shell is recessed inward with a small through-hole, and the through-hole is sealed with glass after melting at high temperatures.

9 Claims, 8 Drawing Sheets

TEMPERATURE CONTROL CUP

CROSS REFERENCE TO THE RELATED APPLICATIONS

This application is based upon and claims priority to the U.S. provisional application No. 62/896,245, filed on Sep. 5, 2019, the entire contents of which are incorporated herein by reference.

TECHNICAL FIELD

The present application relates to the field of thermos cups, and in particular, to a temperature control cup.

BACKGROUND

In daily life, the thermos cup is used to store liquids and has the function of holding heat. It can be used by adults and children. However, in daily use, it is found that the liquid in the cup usually stays too high for a long time, resulting in people not drinking it directly, or even pouring it out for cooling or opening the thermos cup lid to cool it before using it. When the temperature is high, drinking water may cause burns. And if the cup lid is opened for cooling, this consumes not only a long time and also the overall temperature of the liquid inside the insulated cup decreases, which significantly reduces the total duration of the hot keeping time and cannot meet the needs of the user.

Besides, the temperature of the liquid in insulated cup products on the market continues to decrease over time, making it difficult to provide a uniform drinking taste.

No effective solution has been proposed to solve the above problems. The invention provides a temperature control cup that can quickly reduce the temperature of superheated drinks so that people can directly drink drinks with very high initial temperature; meanwhile, it has a long-term temperature keeping function that can keep the temperature constant at a suitable point for a long time.

SUMMARY

The primary purpose of this application is to provide a temperature control cup to solve the technical problems that the initial temperature of the thermal insulation cup is too high, the thermal insulation time is short, and the thermal insulation temperature is unstable. In the prior art, a complete vacuum layer and a temperature-controlling material layer cannot be produced at the same time, resulting in a short holding time, and the temperature in the cup cannot be automatically adjusted to a temperature suitable for drinking by the human body, which results in waiting for a long time before starting drinking. In addition, the temperature of the beverage in the existing thermos cup keeps decreasing, and it is difficult for the user to obtain a uniform taste.

In order to achieve the above object, according to one aspect of the present application, a temperature control cup is provided. The temperature control cup includes a cup body and a cup cover, and cup cover covers the cup body. The cup body is provided in order from the outside to the inside, a cup shell, a cup middle shell and a cup inner wall; a vacuum insulation layer is provided between the cup outer shell and the cup middle shell, and a getter support is provided in the vacuum heat insulation layer at the bottom of the cup body, The getter holder is fixed on the inside of the bottom of the cup outer shell, and the getter holder contains a vacuum getter; a phase change material layer is provided between the middle shell of the cup body and the inner wall of the cup body; the bottom center of the cup body outer shell is recessed inward, and the deepest part is provided with a through-hole. The through-hole is sealed with glass beads after high temperature melting to form a sealed glass; There is a buffer layer between the top of the phase change material layer and the cup mouth; a cup mouth thread is provided inside the cup mouth of the inner wall of the cup, and a thread matching the cup mouth thread is provided at the lower end of the cup cover. The primary function of the phase change material layer is to regulate the temperature of the drink in the cup. Select a phase change material with a phase change point temperature of 35° C.-65° C. When the temperature of the beverage in the cup is too hot (such as greater than 60° C.), the phase change material layer quickly absorb excess heat in the drink within 2-5 minutes; when the temperature of the drink in the cup is lower than the phase change point of the phase change material, the material layer will slowly release the internally stored heat back into the drink, keeping the temperature of the drink at the same temperature near the phase transition point temperature of the material. When the temperature inside the cup exceeds the phase change point, the phase change material partially or completely transform from a solid-state to a liquid state; when the temperature of the beverage in the cup is lower than the phase change point, the phase change material partially or completely transform from a liquid state to a solid state. The vacuum insulation layer prevents the loss of heat. The function of the buffer layer is that there is an error when the phase change material is loaded or the phase change material is converting from a solid-state to a liquid state, and its density and volume changes. The buffer layer leaves room to adapt to this change. The vacuum getter sucks out the residual air of the vacuum insulation layer. The glass beads are placed in the recess at the bottom of the cup shell. The glass beads are placed in the recess and heated to about 600° C. After the gas in the vacuum insulation layer is thermally expanded and eliminated, the glass beads also begin to melt. At the beginning of the cooling process, after the cooling, the vacuum getter in the vacuum insulation layer absorbs the remaining air.

Further, the cup outer shell is composed of a cup outer body shell, a cup outer bottom shell, and a cup outer mouth shell, and the upper and lower ends of the cup outer body shell are respectively welded with the cup outer mouth shell and the cup outer bottom shell.

Further, the cup outer shell, the cup middle shell, and the cup inner wall are all made of stainless steel.

Further, the phase change material layer is a phase change material layer made of one or more of a non-toxic hydrated inorganic salt, a thermally conductive additive, and a stabilizing additive. The phase transition temperature is 35° C. to 65° C. Adding thermal conductivity additives and stabilization additives to phase change materials makes the phase change materials have better thermal conductivity, better stability, and less separation of phase change points.

Further, the cup outer shell is sprayed with an anticorrosive paint layer.

Further, a silicone cushion layer is pasted on the bottom of the cup shell.

Further, the cup middle shell is composed of a cup body middle shell, a cup bottom middle shell, and a cup mouth middle shell. The upper and lower ends of the cup body middle shell are respectively welded with the cup mouth middle shell and the cup bottom middle shell.

Further, the cup inner wall is composed of the cup body inner wall, the cup bottom inner wall, and the cup mouth inner wall. The lower end of the inner wall of the cup body is welded to the cup bottom inner wall.

Further, the cup lid is a bouncing-type cup lid. The function of the water seal is mainly a small umbrella-like structure below the bouncing cup lid. The structure of the small umbrella is a circle above a connecting rod, which is connected to a button on the mug cover. With the lid open, you can pour the beverage out of the cup.

The main function of the cup is to quickly reduce overheated beverages (greater than 65° C.) to a temperature range (35° C.-65° C.) that the human body can reference and maintain a constant temperature. The cooling target temperature and the constant temperature is directly related to the phase change temperature of the phase change material filled in the cup body. The temperature control cup structure can reach the constant temperature holding time extended to more than 8 hours.

In this application, a vacuum insulation layer is used for effective heat insulation, and a phase change material is used to control the temperature of the drink in the cup effectively, and the cup structure is reasonable, which can achieve long-term heat preservation and constant temperature to fix the temperature, the technical effect of long holding time and no scalding after drinking is achieved, and the temperature of the typical drinking beverage can be maintained, thereby solving the technical problem of short holding time of the insulated cup.

BRIEF DESCRIPTION OF THE DRAWINGS

The accompanying drawings, which form a part of this application, serve to provide a further understanding of the application and make other features, objects, and advantages of the application more apparent. The drawings and descriptions of the schematic embodiments of the present application are used to explain the present application and do not constitute an improper limitation on the present application. In the drawings.

Figure 1:
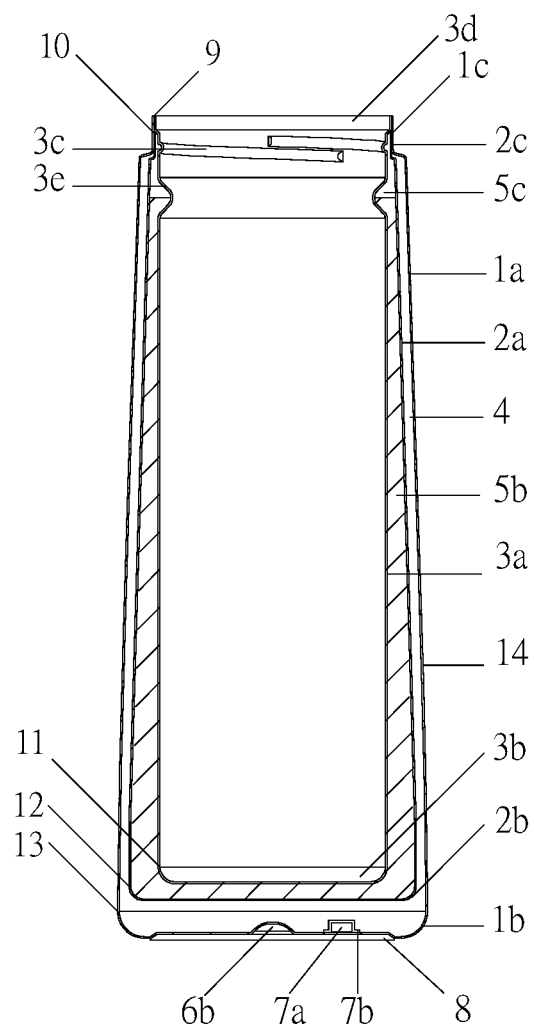
FIG. 1 is a first cross-sectional view of a temperature control cup according to the present invention.
Figure 2:
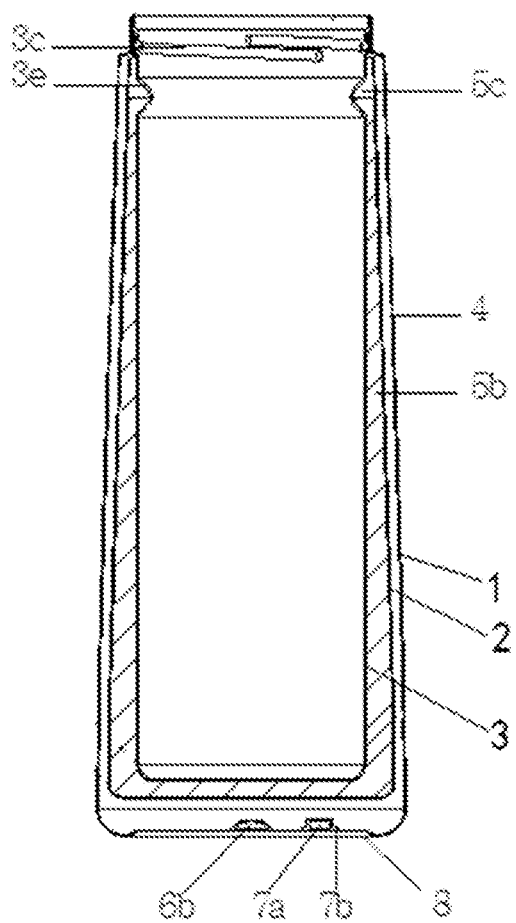
FIG. 2 is a second cross-sectional view of a temperature control cup according to an embodiment of the present application.
Figure 3:
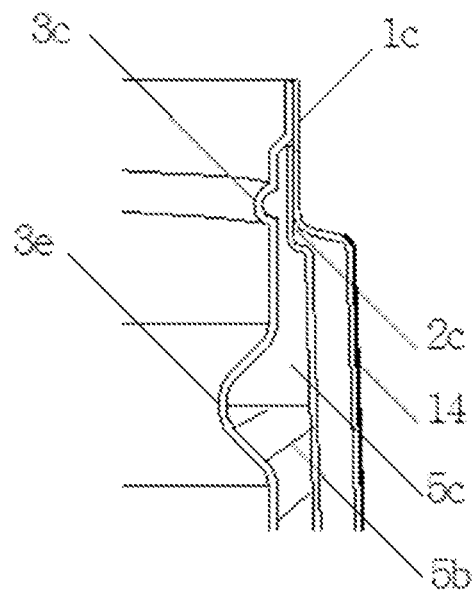
FIG. 3 is a detailed structural view of a cup mouth of a temperature control cup according to an embodiment of the present application.
Figure 4:
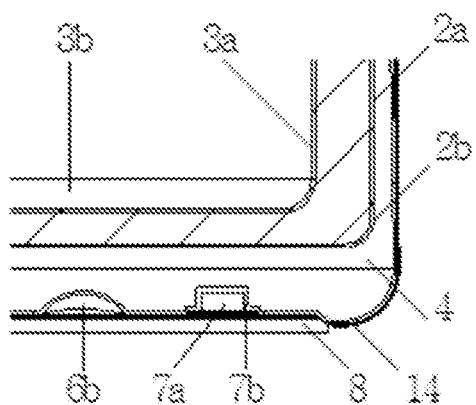
FIG. 4 is a detailed structural view of a cup-bottom of a temperature control cup according to an embodiment of the present application.
Figure 5:
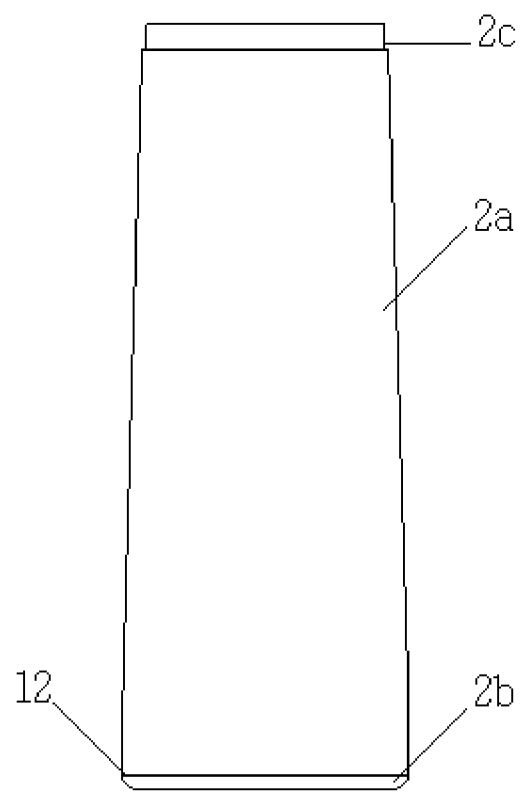
FIG. 5 is a structural diagram of a middle shell of a cup body of a temperature control cup according to an embodiment of the present application.
Figure 6:
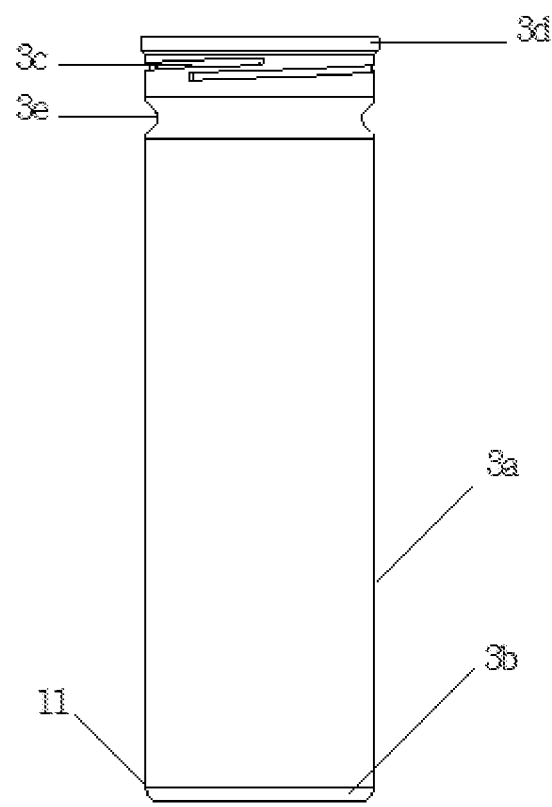
FIG. 6 is a structural diagram of a cup inner wall of a temperature control cup according to an embodiment of the present application.
Figure 7:
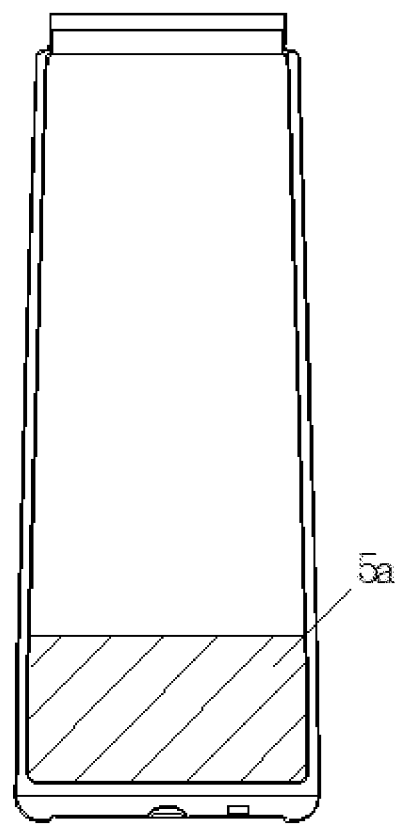
FIG. 7 is a state diagram of a filling phase change material of a temperature control cup according to an embodiment of the present application.
Figure 8:
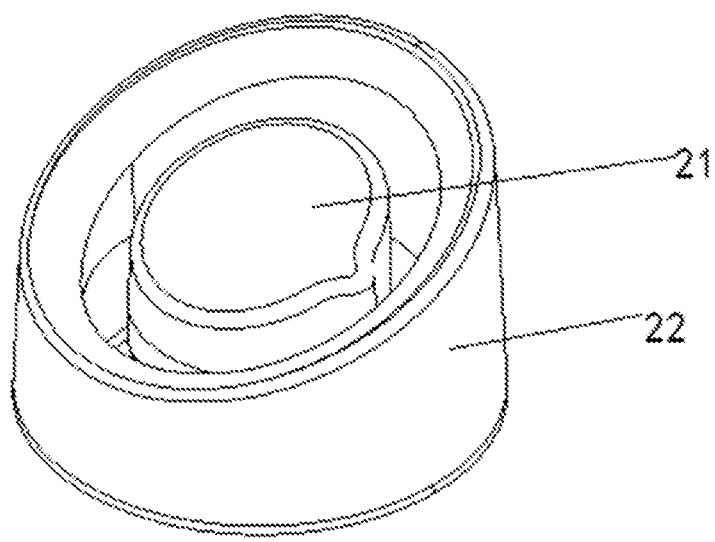
FIG. 8 is a perspective view of a cup lid of a temperature control cup according to an embodiment of the present application.
Figure 9:
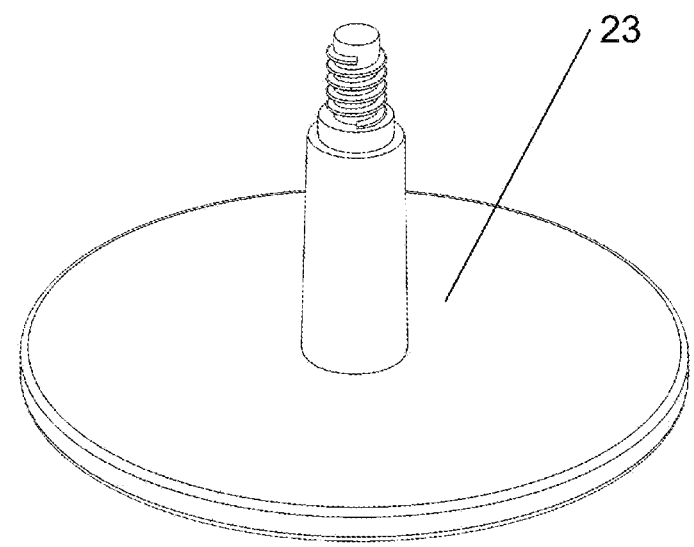
FIG. 9 is a structural view of a small umbrella at the bottom of a cup lid of a temperature-controlling cup according to an embodiment of the present application.

In the figures: 1. Cup outer shell; 2. Cup middle shell; 3. Cup inner wall; 4. Vacuum insulation layer; 1a. Outer body shell; 1b. Outer bottom shell; 1c. Outer mouth shell; 2a Middle body shell; 2b. Middle bottom shell; 2c. Middle mouth shell; 3a. Inner body wall; 3b. Inner bottom wall; 3c. Cup mouth thread; 3d. Inner mouth wall; 7a. Vacuum getter; 7b. Getter supporter; 5b. Phase change material layer; 6b. Seal glass; 5c. Buffer layer; 8. Silicone cushion pad; 14. Anticorrosive paint layer; 22. Cup lid holder; 23. Umbrella; 9: welding point #9; 10: welding point #10; 11: welding point #11; 12: welding point #12; 13: welding point #13.

DETAILED DESCRIPTION OF THE EMBODIMENTS

In order to enable those skilled in the art to better understand the solutions of the present application, the technical solutions in the embodiments of the present application will be clearly and completely described with reference to the drawings in the embodiments of the present application. The described embodiments are only examples that are part of this application, but not all examples. Based on the embodiments in this application, all other embodiments obtained by a person of ordinary skill in the art without creative efforts should fall within the protection scope of this application.

It should be noted that the terms "including" and "having," and any variations in the description and claims of the present application and the above drawings are intended to cover a non-exclusive inclusion. In this application, the orientation or positional relationship indicated by, "up", "down", "top", "bottom", "inside", "outside" and the like is based on the orientation or positional relationship shown in the drawings. These terms are mainly used to describe the present application and its embodiments better and are not used to limit that the indicated device, element, or component must have a specific orientation, or be constructed and operated in a specific orientation. For those of ordinary skill in the art, the specific meanings of these terms in this application can be understood according to specific situations.

In addition, the terms "provided", "connected", and the likes should be interpreted broadly. For those of ordinary skill in the art, the specific meanings of the above terms in this application can be understood according to specific situations.

It should be noted that, in the case of no conflict, the embodiments in the present application and the features in the embodiments can be combined. The application is described in detail below with reference to the drawings and embodiments.

As shown in FIGS. 1-9, the temperature control cup includes a cup body and a cup lid. The cup lid is covered on the cup body. The cup body is provided in order from the outside to the inside with the cup outer shell 1, the cup middle shell 2, and the cup inner wall 3. The vacuum insulation layer 4 is provided between the cup shell 1 and the middle shell 2 of the cup, and the getter support 7b is arranged in the vacuum insulation layer 4 at the bottom of the cup, and the getter support 7b is fixed to the bottom of the cup outer shell 1, the vacuum getter 7a is contained in a getter holder 7b. The phase change material layer 5b is provided between the middle shell 2 and the inner wall 3, and the phase change material layer 5b is filled with the phase change material. The center of the bottom of the cup shell 1 is recessed inward, and the deepest recess is provided with a through-hole, and the through-hole is sealed with glass beads after high temperature melting to form the sealing glass 6b. The buffer layer 5c is provided between the top of the phase change material layer 5b and the cup mouth of the cup body. The cup mouth thread 3c is provided on the inner side of the cup mouth of the inner wall 3 of the cup, and the thread matching the cup mouth thread 3c is provided on the lower end of the cup lid. The primary function of the phase change material layer 5b is to maintain a constant temperature in the cup. A phase change material with a phase change point temperature of 58° C. is selected. When the temperature of the beverage in the cup is too hot (greater than 58° C.), the phase change material layer 5b quickly absorbs excess heat in the drink within 2-5 minutes. When the temperature of the drink in the cup is lower than the phase change point of the phase change material, the phase change material layer slowly releases the internally stored heat back into the drink, keeping the temperature of the drink in the phase near the phase transition point temperature of the material. When the temperature inside the cup exceeds the phase change point, the phase change material is partially or entirely transformed from a solid-state to a liquid state; when the temperature of the beverage in the cup is lower than the phase change point, the phase change material is partially or completely transformed from a liquid state to a solid state. The vacuum insulation layer 4 mainly plays a role in preventing temperature loss. The function of the buffer layer 5c is that there is a certain error when the phase change material is loaded or the phase change material is converted from a solid-state to a liquid state, and its density and volume changes. The buffer layer 5c leaves room for adapting to this change. The vacuum getter 7a sucks away the air remaining in the vacuum insulation layer 4. The glass beads are placed in the recess at the bottom of the cup shell 1, and the glass beads are heated to about 600° C. After the gas in the vacuum insulation layer 4 is thermally expanded and eliminated, the glass beads also begin to melt. At the time of the through-hole, the cooling is started, and after the cooling and cooling, the vacuum getter 7a in the vacuum insulation layer 4 absorbs the remaining air.

As shown in FIGS. 1-9, the cup outer shell 1 is composed of the outer body shell 1a, the outer bottom shell 1b, and the outer mouth shell 1c. The lower end of the cup body shell 1a is welded with outer bottom shell 1b. The cup outer shell 1, the cup middle shell 2, and the cup inner wall 3 are all made of 304 stainless steel.

As shown in FIGS. 1-9, the phase change material layer 5b is made of non-toxic hydrated inorganic salts, thermally conductive additives, and stabilizing additives. The phase change point of the phase change material is 58° C. Adding thermal conductivity additives and stabilization additives to phase change materials makes the phase change materials have better thermal conductivity, better stability, and less separation of phase change points.

As shown in FIGS. 1-9, the cup outer shell 1 is sprayed with the anti-corrosive paint layer 14, and the silicone cushion layer 8 is pasted on the bottom of the cup outer shell 1. As shown in FIG. 1, the cup middle shell 2 is composed of the middle body shell 2a, the cup-bottom middle shell 2b, and the middle mouth shell 2c. The lower end of the middle body shell 2a is welded with the cup-bottom middle shell.

As shown in FIGS. 1-9, the inner wall 3 of the cup is composed of the inner body wall 3a, the inner bottom wall 3b, and the inner mouth wall 3d. The lower end of the inner body wall 3a is welded to the inner bottom wall 3b. The inner mouth wall 3d of the mouth is provided with a water-sealing mouth 3e recessed inward.

As shown in FIGS. 1-9, the lid is a bounce-type lid. The function of the water seal 3e is mainly a small umbrella-like structure below the bounce-type cup lid. The structure is a circular top with a connecting rod connected to the button of the cup cover. When the button is pressed down, the drinks can be poured out.

The primary function of the cup in this embodiment is to quickly reduce the overheated beverage (higher than 56° C.) to a temperature that can be drunk by the human body and keep the temperature constant. The temperature control cup structure can reach the constant temperature holding time extended to more than 8 hours.

In this embodiment, a vacuum insulation layer is used for effective heat insulation, and a phase change material is used to control the temperature of the beverage in the cup effectively, and the cup structure is reasonable, which can achieve both long-term heat preservation and constant temperature The purpose of keeping it at a fixed temperature achieves the technical effect of long heat preservation time and no scalding after drinking. It can have a normal temperature of the human body to drink beverages, thereby solving the technical problem of short heat preservation time of the insulated cup. It has a long holding time and can keep the temperature in the cup at a stable temperature.

The above description is only a preferred embodiment of the present application and is not intended to limit the present application. For those skilled in the art, the present application may have various modifications and changes. Any modification, equivalent replacement, or improvement made within the spirit and principle of this application shall be included in the protection scope of this application.

The invention claimed is:

1. A temperature control cup, comprising a cup body and a cup cover, wherein
   the cup cover is rotationally fastened to the cup body;
   the cup body comprises a cup outer shell, a cup middle shell a cup inner wall, wherein
   the cup outer shell and the cup middle shell form a vacuum heat insulation layer; a getter holder is fixed on an inside of a bottom of the cup outer shell, and the getter holder contains a vacuum getter;
   a phase change material layer is filled between the cup inner wall and the cup middle shell; a center of the bottom of the cup outer shell is recessed inward and a through-hole is provided at a deepest point in the center of the bottom of the cup outer shell; the through hole is sealed with a sealing glass formed by melting glass beads at a high temperature; a buffer layer is provided between a top of the phase change material layer and a cup mouth of the cup body; an inside of the cup mouth is provided with a cup mouth thread, and a lower end of the cup cover is provided with a thread matching the cup mouth thread.

2. The temperature control cup according to claim 1, wherein the cup outer shell comprises a cup bottom shell and a cup mouth shell, and a cup body shell, and a lower end of the cup body shell is welded with the cup bottom shell.

3. The temperature control cup according to claim 1, wherein the cup shell, the cup middle shell, and the cup inner wall are all made of stainless steel.

4. The temperature control cup according to claim 1, wherein the phase change material layer is made of one or more of a non-toxic hydrated inorganic salt, a thermally conductive additive, and a stabilizing additive; and a phase change point temperature of a phase change material in the phase change material layer ranges from 35° C. to 65° C.

5. The temperature control cup according to claim 1, wherein the cup body outer shell is sprayed with an anti-corrosive paint layer.

6. The temperature control cup according to claim 1, wherein the bottom of the cup outer shell is covered with a silica gel cushion layer.

7. The temperature-control cup according to claim 1, characterized in that the cup middle shell comprises a middle body shell, a middle bottom shell and a middle mouth shell; a lower end of the middle body shell is welded to the cup middle bottom shell, the middle mouth shell is welded to the cup outer mouth shell, a welding point is 2 to 5 mm below a top of the cup outer mouth shell.

8. The temperature-controlling cup according to claim 1, wherein the cup inner wall of the cup body comprises a cup inner body wall, and a cup inner bottom wall, and a cup inner mouth wall; an upper end is welded to a top of the cup outer mouth shell, and a lower end of the inner body wall is welded to the cup inner bottom wall; the cup inner mouth wall is provided with an inwardly recessed water seal brim.

9. The temperature-controlled cup according to claim 1, wherein the cup lid is a bounce-type cup lid.

\* \* \* \* \*